United States Patent
Pirkl et al.

(10) Patent No.: US 7,408,462 B2
(45) Date of Patent: Aug. 5, 2008

(54) CONTROL OF MONITORED ZONE

(75) Inventors: Klaus Pirkl, Büttelborn (DE); Manfred Haberer, Riegel (DE); Gerhard Mutter, Ibach (DE)

(73) Assignee: Sick AG, Waldkirch/Breisgau (DE)

( * ) Notice: Subject to any disclaimer, the term of this patent is extended or adjusted under 35 U.S.C. 154(b) by 154 days.

(21) Appl. No.: 11/216,567

(22) Filed: Aug. 31, 2005

(65) Prior Publication Data

US 2006/0067579 A1 Mar. 30, 2006

(30) Foreign Application Priority Data

Sep. 16, 2004 (DE) .................... 10 2004 044 973

(51) Int. Cl.
*G08B 13/18* (2006.01)

(52) U.S. Cl. .................. 340/557; 340/540; 340/551; 340/539.22; 340/539.23; 340/539.25; 340/673; 340/676

(58) Field of Classification Search ............... 340/557, 340/673, 676, 551, 552, 540, 541, 539.22, 340/539.23, 539.25; 382/103, 106, 107; 250/221, 224

See application file for complete search history.

(56) References Cited

U.S. PATENT DOCUMENTS

| | | | | |
|---|---|---|---|---|
| 4,896,211 A | * | 1/1990 | Hunt et al. .................. 348/132 |
| 5,621,807 A | * | 4/1997 | Eibert et al. ................. 382/103 |
| 5,903,355 A | * | 5/1999 | Schwarz ..................... 356/394 |
| 6,286,102 B1 | * | 9/2001 | Cromer et al. ................ 726/35 |
| 6,300,872 B1 | * | 10/2001 | Mathias et al. .............. 340/540 |
| 6,812,450 B2 | * | 11/2004 | Hipp .......................... 250/221 |
| 6,898,333 B1 | * | 5/2005 | Gopalakrishnan et al. ... 382/289 |
| 6,987,451 B2 | * | 1/2006 | McKeown et al. ........... 340/541 |

FOREIGN PATENT DOCUMENTS

| | | |
|---|---|---|
| DE | 43 20 485 | 12/1994 |
| DE | 44 11 448 | 10/1995 |
| DE | 195 23 843 | 1/1997 |
| DE | 199 59 623 | 6/2001 |
| DE | 101 41 055 | 3/2003 |

OTHER PUBLICATIONS

Jan. 11, 2005 German Search Report for German Patent Application No. 10 2004 044 973.2, with English translation.

* cited by examiner

*Primary Examiner*—Hung T. Nguyen
(74) *Attorney, Agent, or Firm*—Harness, Dickey & Pierce, P.L.C.

(57) ABSTRACT

The invention relates to a method for the control of a monitored zone, in particular at transport devices for objects, wherein the monitored zone is scanned by means of at least one spatially resolving sensor, in particular a laser scanner and/or a camera system, the positions of object points in the monitored zone are determined and a contour search is carried out in at least a sub-set of the determined positions in that these positions are mathematically examined as to whether the respective object points lie on at least one model line pre-determined with respect to shape and/or length within a pre-determinable tolerance, said model line corresponding to at least a part of a contour of a permitted object in the monitored zone, with the contour search being carried out independently of the location of the positions relative to the sensor.

16 Claims, 2 Drawing Sheets

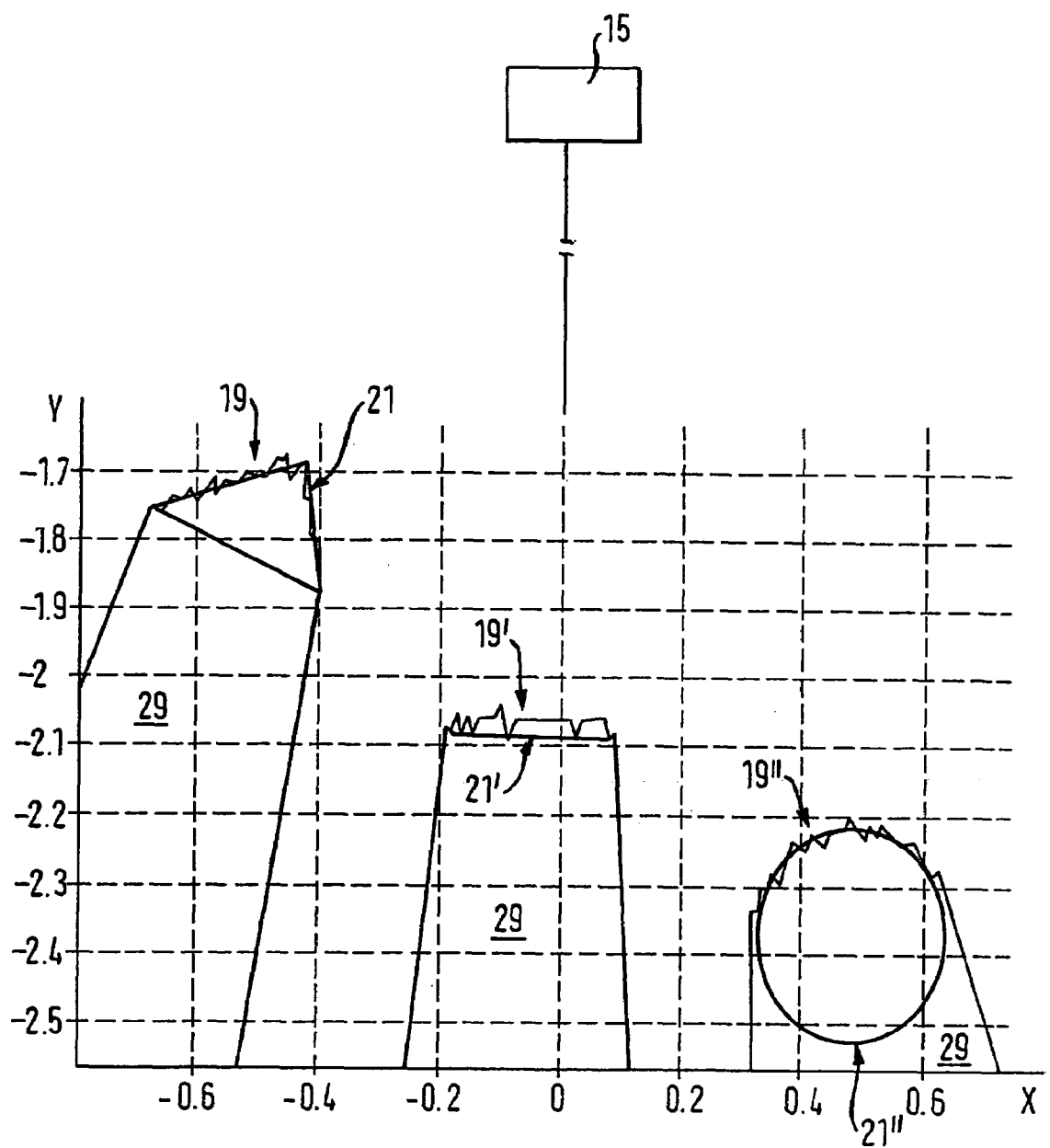

CONTROL OF MONITORED ZONE

CROSS-REFERENCE TO RELATED APPLICATIONS

This application claims the benefit of German Patent Application No. DE 10 2004 044 973.2, filed on Sep. 16, 2004. The disclosure of the above application is incorporated herein by reference.

FIELD AND BACKGROUND OF THE INVENTION

The invention relates to a method for the control of a monitored zone, in particular at transport devices for objects, wherein the monitored zone is scanned by means of at least one spatially resolving sensor, in particular a laser scanner and/or a camera system, and the positions of object points in the monitored zone are determined.

The invention moreover relates to a process device, in particular a transport device for objects, comprising at least one spatially resolving sensor for the control of a monitored zone associated with the process device.

The invention furthermore relates to a sensor for the control of a monitored region, in particular at transport devices for objects.

It is frequently necessary on the conveying of objects by means of transport systems which are made, for example, as roller conveyors or a conveyor belt, when the transported objects are transferred from one zone into another zone, to prevent persons from intruding or entering into the transfer zone also called a transport lock or even passing through this transfer zone. To ensure this safety of persons, the transport locks are currently secured by combinations of light barriers, light grids and laser scanners providing variable protected fields.

The transport locks are moreover usually provided with additional sensors for automation and control tasks in order, for example, to carry out overhang controls, checks of pallet heights, checks of the degree of filling of pallets or length measurements on the transported good. Separate sensor systems have therefore previously been used for the automation and/or control functions, i.e. for the normal process control, on the one hand, and for the required safety functions, on the other hand, which means a relatively high installation and connection effort and is not least associated with high space requirements. In addition, a substantial effort is required to link the normal process control with the security control.

A method and an apparatus for the control of a pre-determined monitored zone are known from DE 44 11 448 A1. A laser scanner, in particular arranged close to the edge of a monitored zone to be controlled, determines spacing contour functions and compares these with stored reference contour functions each representing an expected object contour. A check is made within the framework of pre-determined tolerance limits whether a determined spacing contour function coincides with a reference contour function or not. Although this known device is capable of reliably distinguishing persons intruding into the monitored zone from permitted objects, it is a disadvantage here that objects which are actually permitted can also trigger the emission of a warning signal if they do not pass through the monitored zone in the manner pre-determined by the previously obtained reference contour function determined, for example, by a teaching procedure. An object expected, for example, in the center of a conveyor belt, but actually lying in the edge region on the transport belt when passing through the monitored zone results in the emitting of a warning signal with the known control methods due to the deviation of the measured spacing contour function from the stored reference contour function even though the object is an object permitted per se. The lack of flexibility of the solution known from DE 44 11 448 A1 is consequently in particular a problem.

SUMMARY OF THE INVENTION

It is therefore the object of the invention to design the control of monitored zones as flexibly as possible and to ensure maximum safety for persons in this process.

This object is satisfied in accordance with the invention by the features of the independent method claim and in particular in that a contour search is carried out in at least a sub-set of the positions corresponding to the determined object points in the monitored zone in that these positions are examined mathematically as to whether the respective object points lie on at least one model line pre-determined with respect to shape and/or length within a pre-determined tolerance, said model line corresponding at least to a part of a contour of a permitted object in the monitored zone, with the contour search being carried out independently of the location of the positions relative to the sensor.

The underlying object of the invention is moreover satisfied by the features of the claim directed to a process device and in particular in that the process device has at least one sensor made for the carrying out of the method in accordance with the invention and provided for the control of a monitored zone associated with the process device.

The object is furthermore satisfied by the features of the claim relating to a sensor and in particular in that the evaluation device of the sensor is made for the carrying out of a contour search in accordance with the method in accordance with the invention on the basis of positions corresponding to object points in the monitored zone.

In accordance with the invention, a contour search is therefore carried out on the basis of the determined positions or object points irrespective of how these positions are disposed relative to the sensor. An object is consequently recognized as a permitted object independently of how it is oriented relative to the sensor and of the spacing it has to the sensor. A pre-determined model line is admittedly used in accordance with the invention. However, it is particularly not the location of the model line in space and in particular not the orientation of the model line relative to the sensor which is important in the invention. It is solely decisive whether the measured object points—or at least a sub-set thereof—have a relative arrangement to one another such that these object points lie on the respective model line within specific tolerance limits, that is whether the arrangement of the object points within specific limits can be described by at least one of the pre-determined model lines.

Expressed in illustrative terms, a mathematical check is therefore made in accordance with the invention whether the measured object points can be placed on a pre-determined model line or not. The quality with which a set of measured object points geometrically matches one or more expected model lines is in particular calculated in this process.

The invention is therefore in particular characterized in that the positions are only set into relation with one another in the contour search. As already mentioned, in accordance with the invention, the location of the positions or of the respective object points relative to the sensor or to other objects is not important. The invention hereby makes a particularly flexible control of monitored zones possible.

The method in accordance with the invention can in particular be used advantageously when the permitted objects in the monitored zone, for example in a transport lock, have contours which can be detected by means of the sensor of the type which correspond to particularly simple geometrical model lines such as sections of straight lines or circles. Objects of this type can be particularly easily distinguished from persons.

A further substantial advantage of the invention is the low installation effort and space requirements associated with it since the sensor can simultaneously take over all control and security functions required at the respective monitored zone. It is furthermore possible with the invention, on the one hand, to distinguish between different positions or orientations of permitted objects relative to the sensor, but, on the other hand, to recognize permitted objects as such independently of their respective positions and orientations so that unnecessary interventions in the operating procedure of the process device, for example unnecessary switching off procedures of the transport device, can be avoided without compromises in security.

It is furthermore of advantage in accordance with the invention for the sensor to be able to be integrated without problem into the security concept of the respective process device and in particular to be able to itself form a substantial component of the security device. The linking of control-related demands, on the one hand, and security-relevant demands, on the other hand, is possible in a particular simple manner by the invention.

The sensor is in particular a spatially resolving optoelectronic protective device in accordance with the scanning principle such as a laser scanner or a camera system, for example a stereoscopic, triangulation based or time-of-flight based camera system. Combined scanner/video systems can generally also be considered. Furthermore, the spatial resolution does not necessarily have to take place in three dimensions. It is rather also possible to carry out the contour search only in one plane.

In accordance with a preferred embodiment of the invention, provision is made for the determined positions to be divided into a plurality of sub-sets and for a separate contour search to be carried out for each sub-set.

The positions determined overall in a measurement, that is in a scan in the case of a laser scanner, do not have to be treated as a whole. It is rather possible to carry out a division of the monitored zone prior to the actual contour search with reference to specific criteria such that different zones are subjected to a contour search separately.

An object search can in particular be carried out prior to the actual contour search in that the respective spacing between two adjacent positions is compared with a pre-determined threshold and the two positions are associated with a common sub-set when the threshold is not reached and are associated with different sub-sets when the threshold is exceeded.

This procedure is based on the consideration that, in many objects occurring in practice, their contours do not have any extreme changes in direction—naturally apart from the edge regions—i.e. the object distances measured by means of the sensor do not change abruptly (in a jump) from one measured point to the next as long as the same object is being scanned. If, in contrast, a jump position of this type, that is an exceeding of the pre-determined threshold, is detected, it can be assumed that the two adjacent positions between which the jump has occurred lie on different objects in the monitored zone.

Provision is furthermore preferably made in accordance with the invention for the pre-determined model line to be aligned with respect to the positions of the sub-set in the contour search such that at least two reference positions, preferably one of the first positions and one of the last positions of the sub-set, lie on the model line and the spacing of the positions lying therebetween from the model line, from an auxiliary line derived from the model line or from a characteristic point of the model line or auxiliary line are determined and are subjected to a spacing evaluation.

Provision is in particular made in the spacing evaluation for the determined spacing to be subjected to an averaging process and for a quality for the coincidence of the sub-set with the model line to be determined with reference to a standard deviation derived therefrom.

In this embodiment, the contour search is consequently based on the evaluation of spacing with respect to a line or to a point whose location relative to the positions is determined by the positions themselves—in particular by special reference positions. An independence from the location or orientation of the object points measured by means of the sensor from the sensor itself is hereby realized in a particularly elegant manner.

Provision is furthermore preferably made in accordance with the invention for a safety signal to be generated in the case of an unsuccessful contour search and for a process device associated with the monitored zone, in particular a transport device for objects, to be brought into a safe state on the basis of the safety signal. This can in particular take place by switching off the process device.

In this manner, the sensor associated both with the process control and with the security control of the process device can intervene directly in the operating procedure of the process device by means of a safety signal.

The safety signal can be generated directly on the basis of the determined positions by means of the sensor or of a safety module, in particular a local safety module, associated with the sensor.

The invention hereby makes possible a security invention in the process device practically on a raw data basis, whereby the sensor system effort at the monitored zone is minimized.

The sensor in accordance with the invention is preferably a laser scanner of a generally known construction with a transmitter device, e.g. in the form of a laser diode, for the transmission of pulsed scanning radiation, for example in the IR range. The transmission of the transmitted radiation pulses in particular takes place via a deflection device, e.g. in the form of a rotating mirror, so that the laser scanner transmits transmitted radiation pulses sequentially in different directions within a scan plane. The laser scanner furthermore includes a receiver device, in particular in the form of one or more radiation-sensitive receiver diodes. The transit time of the transmitted and received radiation pulses is determined by means of a corresponding evaluation electronic system and the distances of objects reflecting the radiation pulses to the sensor are determined from this transit time.

Since the directions in which the radiation pulses are respectively transmitted are likewise known, e.g. via the position of the rotating mirror, the laser scanner consequently delivers a set of measured points for which the direction and distance are respectively known with respect to the sensor. The angular resolution and the distance measurement precision of the scan can be varied by a corresponding setting of the operating parameters of the laser scanner.

In the case of a sensor made as a laser scanner, the contour search can consequently be carried out on the basis of direction-dependent depth information determined within one scan plane.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a representation for the explanation of the method in accordance with the invention.

DETAILED DESCRIPTION OF THE PREFERRED EMBODIMENTS

Figure 1:
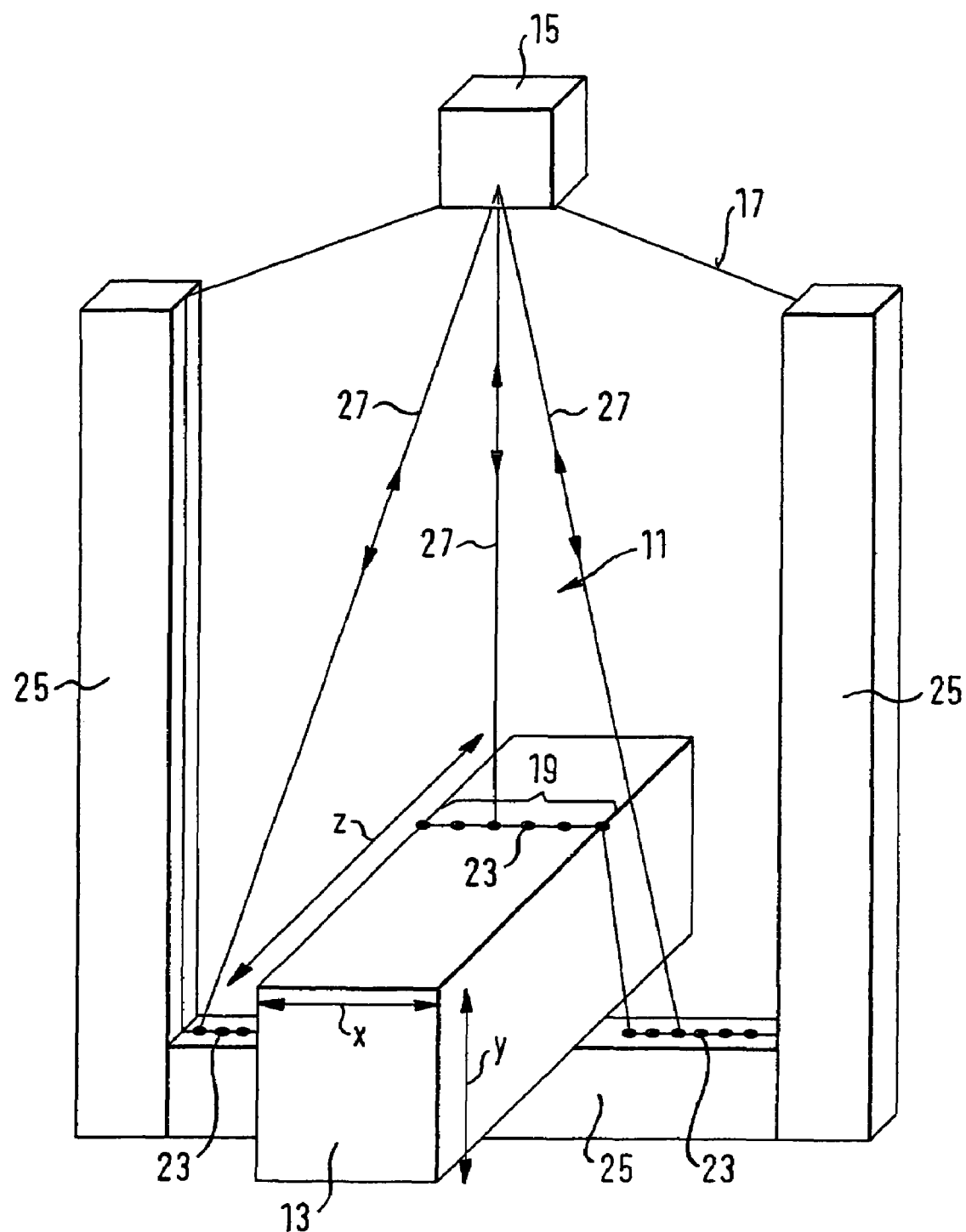
FIG. 1 is a schematic perspective view of a transport lock for objects with a monitoring sensor in accordance with the invention.

The following description of the preferred embodiment(s) is merely exemplary in nature and is in no way intended to limit the invention, its application, or uses.

FIG. 1 schematically shows a transport lock at which an object 13—shown here in the form of a parallelepiped—conveyed by means of a transport device not shown is conveyed from a zone in front of the transport lock to a zone behind the transport lock.

The transfer zone is monitored by means of a sensor 15 in the form of a laser scanner only shown schematically. The scan beams 27 transmitted by the scanner 15 and only indicated in FIG. 1 define a monitored zone 11 in the form of a scan plane 17 which extends perpendicular to the transport direction z of the objects 13. As already mentioned above, the use of a laser scanner as the sensor 15 is not compulsory in accordance with the invention. The monitoring can also take place by means of a camera system, for example.

The scan radiation 27 is reflected at boundaries 25 forming the transport lock and—when a transported object 13 is located in the monitored zone 11 as in FIG. 1—from this object 13 and is received and evaluated by means of the sensor 15. The corresponding object points 23 at which the radiation is reflected are indicated by dots purely schematically in FIG. 1 for the lower boundary 25 extending horizontally and for the object 13 itself. Due to the parallelepiped shape of the object 13, the object points 23 lying on the object 13, which represent a sub-set 19 of all object points, form a straight-line object contour parallel to the x direction.

The invention is not limited to the use at transport locks. Generally, any desired monitored zones can be monitored in a manner in accordance with the invention. However, in all cases, a stationary arrangement of the sensor, and thus of the monitored zone, is preferred, with the monitored zone moreover preferably being bounded by components lying inside the range of the sensor which reflect the scan radiation, that is can be "seen" by the sensor.

FIG. 2 shows by way of example a situation with three different objects or object point sub-sets 19, 19', 19" in the monitored zone, with these objects representing permitted or expected objects which have contours with a simple geometrical shape. A situation of this type can occur in practice. In most cases, or at least in many cases, however, a plurality of permitted objects are not located in the monitored zone simultaneously.

The left hand object 19 in FIG. 2 has a parallelepiped shape and is oriented such that the contour "seen" by the scanner 15 includes two straight-line sections extending at an angle of 90°. The middle object 19' is likewise of parallelepiped shape and is oriented parallel to the x direction, with it being located directly beneath the scanner 15 such that the contour "seen" by the scanner 15 is a straight-line section extending horizontally to the x direction. The right hand object 19" is finally a circular cylinder with a contour "seen" by the scanner 15 of partial circular shape.

The zones 29 lie in the "shadow" of the respective objects 19, 19', 19" and can therefore not be seen into by the scanner 15.

The non-smooth "zig-zag"-like lines in FIG. 2 are each created by connecting the actually measured object points which are not shown individually in FIG. 2 and which form the respective sub-set 19, 19', 19" and thus the actual "object" such as is seen by the scanner 15 due to the respective measuring precision. The smooth lines, in contrast, are model lines 21, 21', 21" which are used within the framework of the method in accordance with the invention in the contour search described in the following.

The contour search in accordance with the invention takes place in an evaluation unit (not shown), which is integrated in the scanner 15 or is arranged spatially apart from the scanner 15, using an algorithm which processes the raw data supplied by the scanner 15, i.e. for each measured object point its direction in the form of an angle with respect to a reference direction and its distance from the scanner 15.

Prior to the actual contour search, an object search is first carried out on the basis of the raw data in that the respective spacing between two adjacent positions, i.e. positions measured directly after one another in the same scan, are compared with a pre-determined threshold. If the threshold is not reached, it is assumed that the two respective object points lie on the same object in the monitored zone, whereas if the threshold is exceeded, different objects are assumed. An "object" in this sense can also be a boundary of the monitored zone. The two respective positions are therefore associated either with a common sub-set or with different sub-sets for the further data processing.

The actual contour search is subsequently carried out for each sub-set 19, 19', 19" determined in this manner in that a respective model line 21, 21', 21" is aligned at the positions of the respective sub-set. The model line corresponds to the contour of a respective permitted or expected object such as the scanner 15 would "see" in the ideal case. In the case of a cylindrical object, for example, the model line 21" is a circle with a radius corresponding to the radius of the cylinder. If, in contrast, the object is of parallelepiped shape, the model line can either be a single straight section 21' or an angle 21 formed by two straight sections extending at right angles to one another.

The alignment of the respective model line 21, 21', 21" with respect to the positions forming the respective sub-set 19, 19', 19", i.e. object points, takes place in accordance with a possible practical embodiment of the invention in that the model line is placed in the set of object points mathematically such that the second object point and the penultimate object point of the respective sub-set lie on the model line.

If the model line is a straight line, this straight model line is simply placed through the two mentioned object points. If, in contrast, the model line is a circle or partly circular, the center of this model circle is first determined. For this purpose, a respective tangent is placed at the second object point and the penultimate object point of the sub-set. Subsequently, the orthogonals to the tangents are constructed at these points, said orthogonals intersecting a likewise mathematically constructed bisectrix of the two tangents at different points. The center of the path formed by these two points of intersection is used as the center of the model circle whose radius is equal to the spacing of this center from the two contact points of the tangents, i.e. from the second object point and the penultimate object point.

For the points or positions lying between the reference points, i.e. e.g. the second object point and the penultimate object point, a spacing evaluation is subsequently carried out using the aligned model line, e.g. the previously explained straight model lines or the previously described model circle, in that—for these intermediate positions—their spacing from the model line, from an auxiliary line derived from the model line or from a characteristic point of the model line or auxiliary line are determined.

In the case of the previously described straight model lines, a straight digression line is first derived from this which satisfies the conditions of a function in the mathematical sense. The straight digression line is determined in that the perpendicular is first dropped onto the straight model line for each intermediate position and the amount of this distance is determined. The straight digression line is placed through these perpendicular distances. Subsequently, the spacing of the perpendicular distances from the straight digression lines are determined and it is these spacing which are subsequently subjected to the further spacing evaluation in this case.

In the case of the previously explained model circle, the spacing of the intermediate positions to the center of the model circle previously determined mathematically are determined for the intermediate positions and are used for the further spacing evaluation.

The spacing thus determined, which are in particular characterized in that they are independent of the respective coordinate system and thus independent of the orientation and of the distance of the respective sub-set 19, 19', 19" from the scanner 15, already contain information on the quality with which the respectively observed sub-set 19, 19', 19" of positions or object points coincides with the respective model line 21, 21', 21", i.e. how well the respective sub-set 19, 19', 19" can be described as at least one of the respectively pre-determined model lines 21, 21', 21".

The subsequent spacing evaluation with which this information is extracted consists, in a possible embodiment, of obtaining the root mean square value of the spacing for the respectively observed sub-set and of determining the standard deviation for the mean value thereby obtained. The values for the standard deviation obtained by actual measurements can be evaluated with reference to previously determined experience values so that quality criteria can be fixed with reference to which a decision can be made when an evaluated sub-set of positions/object points should be evaluated as coinciding with a permitted object.

Trial measurements have shown that objects with straight contours can be distinguished clearly and with sufficient security from objects having cylindrical contours. The standard deviations determined in experiments were apart by more than a factor 4. It could likewise be shown that persons located in the monitored zone can be reliably distinguished from objects with contours which can be described clearly by comparatively simple geometrical model lines.

The lines used for the determination of the spacing of the intermediate positions—in the examples explained above the straight digression lines, on the one hand, and the model circle, on the other hand—can be provided with error barriers. Positions lying within the tolerance range hereby fixed are not taken into account in the spacing evaluation, that is do not flow into the object-related standard deviation calculated for the respective sub-set 19, 19', 19".

Within the framework of a preferred practical realization of the invention, the scanner 15 is integrated via a field bus system into a security control of the transport lock or of another process device. If the contour search carried out in the manner in accordance with the invention during normal transport operation remains unsuccessful, i.e. if no contour corresponding to the pre-determined model lines is found within the framework of the respective tolerance in the monitored zone, the sensor 15 generates a safety signal which is transmitted via a security-directed signal output of the sensor 15 directly to the security control which thereupon switches off the transport device or the respective process device or initiates another security measure.

In addition to this security function, the scanner 15 in accordance with the invention can take over normal control or automation functions not directed to security. For this purpose, the raw data anyway available can be provided to further evaluation algorithms which, for example, set the measured positions/object points into relation with the location of the sensor 15 or with the plane of the conveying device in order, in this manner, to e.g. carry out an overhang control or to determine the degree of filling of a pallet passing through the monitored zone.

The description of the invention is merely exemplary in nature and, thus, variations that do not depart from the gist of the invention are intended to be within the scope of the invention. Such variations are not to be regarded as a departure from the spirit and scope of the invention.

| REFERENCE NUMERAL LIST | |
| --- | --- |
| 11 | monitored zone |
| 13 | object |
| 15 | sensor, laser scanner |
| 17 | scan plane |
| 19, 19', 19" | subset of the determined positions/object points |
| 21, 21', 21" | model line |
| 23 | object point |
| 25 | boundary |
| 27 | scan beam |
| 29 | shadow region |

What is claimed is:

1. A method of controlling a monitored zone (11), in particular of transport devices for permitted objects (13) within the monitored zone, comprising:

scanning the monitored zone (11) using at least one spatially resolving sensor (15) that includes one of a laser scanner and a camera system;

determining positions of object points (23) in the monitored zone (11);

executing a contour search in at least one sub-set (19, 19', 19") of the determined positions wherein the sub-set of positions are examined mathematically as to whether the respective object points (23) lie on at least one model line (21, 21', 21") that is pre-determined with respect to one of shape and length within a pre-determinable tolerance, the model line corresponding to at least a part of a contour of the permitted object (13) in the monitored zone (11), wherein the contour search is carried out independently of respective locations of the determined positions relative to the sensor (15) and the positions are only set into relation with one another in the contour search; and generating a safety signal if a contour search is unsuccessful and bringing a process device associated with the monitored zone (11) into a safe state based on the safety signal.

2. A method in accordance with claim 1, wherein the pre-determined model line (21, 21', 22") includes at least one of a straight section and a section of partly circular shape.

3. A method in accordance with claim 1, further comprising dividing the determined positions into a plurality of sub-sets (19, 19', 19") and a executing separate contour searches for each sub-set.

4. A method in accordance with claim 1, further comprising executing an object search prior to the contour search wherein respective spacing between two adjacent positions is compared with a pre-determined threshold and the two positions are associated with a common sub-set (19, 19', 19") when the threshold is not reached and are associated with different sub-sets (19, 19', 19") when the threshold is exceeded.

5. A method in accordance with claim 1, wherein the pre-determined model line (21, 21', 21") is aligned with respect to the positions of the sub-set (19, 19', 19") in the contour search such that at least two reference positions, preferably one of the first positions and one of the last positions of the sub-set, lie on the model line and respective spacing of the positions lying therebetween from the model line, from an auxiliary line derived from one of the model line, a characteristic point of the model line and an auxiliary line are determined and are subjected to a spacing evaluation.

6. A method in accordance with claim 5, wherein the determined spacings are subjected to an averaging process during evaluation of the spacing and a quality for correspondence of the sub-set (19, 19', 19") with the model line (21, 21', 21") is determined with reference to a standard deviation derived therefrom.

7. A method in accordance with claim 1, wherein the safety signal is generated directly on the basis of the determined positions by means of one of the sensor (15) and a safety module, in particular a local safety module, associated with the sensor (15).

8. A method in accordance with claim 1, wherein the monitored zone (11) is scanned by a laser scanner wherein electromagnetic radiation (27), in particular pulsed electromagnetic radiation, is transmitted in a plurality of directions in at least one scan plane (17) and radiation (27) reflected from the monitored zone (11) is received, with the positions of object points (23) in the monitored zone (11) reflecting the radiation (27) being determined from the received radiation (27).

9. A method in accordance with claim 1, characterized in that the monitored zone (11) is scanned by a camera system, in particular one of a stereoscopic, triangulation based and time-of-flight based camera system.

10. A process device in accordance with claim 9, wherein the sensor (15) has at least one security-directed signal output.

11. A process device in accordance with claim 9, wherein the sensor (15) is a component of a security control for the process device, with the security control brings the process device into a secure state, in particular for switching off of the process device, on the basis of a safety signal generated by the sensor (15).

12. A sensor in accordance with claim 11, further comprising:
at least one transmitter device transmitting electromagnetic radiation (27), in particular pulsed electromagnetic radiation, into the monitored zone (11); and
at least one receiver device for detecting radiation (27) reflected from the monitored zone (11) and that is in particular made as a laser scanner.

13. A sensor in accordance with claim 11, wherein the sensor is a camera system, in particular one of a stereoscopic, triangulation based and time-of-flight based camera system.

14. A process device in accordance claim 9, wherein the sensor (15) is integrated into a security control of the process device via a field bus system.

15. A process device for transporting objects (13) within a monitored zone (11), comprising:
at least one spatially resolving sensor (15) including one of a laser scanner and camera system, wherein the sensor (15) determines positions of object points (23) in the monitored zone (11) and executes a contour search in at least one sub-set (19, 19',19", ) of the determined positions, wherein the sub-set of positions are examined mathematically as to whether the respective object points (23) lie on at least one model line (21, 21', 21") that is pre-determined with respect to one of shape and length within a pre-determinable tolerance, the model line corresponding to at least a part of a contour of the permitted object (13) in the monitored zone (11), wherein the contour search is carried out independently of respective locations of the determined positions relative to the sensor (15), wherein the sensor (15) is configured to generate a safety signal if the contour search is unsuccessful.

16. A sensor for controlling a monitored zone (11) of a transport device for objects (13), comprising:
an evaluation device that determines positions corresponding to object points (23) in the monitored zone (11) and that executes a contour search in at least one sub-set (19, 19', 19") of the determined positions, wherein the sub-set of positions are examined mathematically as to whether the respective object points (23) lie on at least one model line (21, 21', 21") that is pre-determined with respect to one of shape and length within a pre-determinable tolerance, the model line corresponding to at least a part of a contour of the permitted object (13) in the monitored zone (11), wherein the contour search is carried out independently of respective locations of the determined positions relative to the sensor (15); and
a signaling device that generates a safety signal if the contour search is unsuccessful.

* * * * *